US008081965B2

(12) United States Patent
Londhe (10) Patent No.: US 8,081,965 B2
(45) Date of Patent: Dec. 20, 2011

(54) SIMPLE TECHNIQUE FOR DETECTION OF PHYSICAL PRESENCE AND MANAGEMENT OF INFORMATION

(75) Inventor: Nilesh Vasante Londhe, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 898 days.

(21) Appl. No.: 11/657,201

(22) Filed: Jan. 23, 2007

(65) Prior Publication Data

US 2008/0174421 A1     Jul. 24, 2008

(51) Int. Cl.
*H04M 11/00* (2006.01)
(52) U.S. Cl. .......... 455/421; 455/404.2; 455/414.2; 455/432.1; 455/456.1
(58) Field of Classification Search ............ 455/404.2, 455/414.2, 421, 432.1, 456.1
See application file for complete search history.

(56) References Cited

U.S. PATENT DOCUMENTS

| 6,745,027 B2 * | 6/2004 | Twitchell, Jr. ............. 455/422.1 |
| 6,807,423 B1 * | 10/2004 | Armstrong et al. ........... 455/440 |
| 7,317,927 B2 * | 1/2008 | Staton et al. ............... 455/456.4 |
| 7,715,373 B1 * | 5/2010 | Parker ........................... 370/352 |
| 2005/0063528 A1 * | 3/2005 | Pearson et al. ........... 379/211.01 |

* cited by examiner

*Primary Examiner* — Kamran Afshar
*Assistant Examiner* — Edward Zhang
(74) *Attorney, Agent, or Firm* — Merchant & Gould P.C.

(57) ABSTRACT

A method, system, and computer readable media that when executed determines and manages presence information and presents the information to a plurality of devices. A determination is made if a presence device is within a range of a detection device. If the presence device is within a detectable range, presence information is prepared. The presence information includes the location of the detection device and the availability of the user of the presence device. Then, the presence device updates a plurality of devices with the presence information.

19 Claims, 7 Drawing Sheets

SIMPLE TECHNIQUE FOR DETECTION OF PHYSICAL PRESENCE AND MANAGEMENT OF INFORMATION

BACKGROUND

Everyday, millions of people log in to their computers using an associated password and username. By logging in and using such personalized information, the presence or absence of the user at a computer terminal can be determined. Alternatively, presence or absence of a user can be determined through a phone system. For instance, calls made by a user are automatically detected. Accordingly, the detection places the caller present. Motion sensor systems also determine presence or absence of a user by detecting movements within a limited range. Still further, a strike of a button on a keyboard or a movement of an associated mouse causes presence to be determined.

Quite recently, "availability" features were introduced into presence/absence determination systems. Availability features provide the user with options describing their current status. Namely, a user could be "unavailable," "available," "busy," "in a meeting," "on a call," etc. As an illustrative example, systems would consider a user "unavailable" if the computer system failed to detect mouse or keyboard movements for a prolonged period of time. Systems were also programmed to go "busy" when associated applications, such as electronic calendars, indicated so. By using the availability feature, other parties interested in the whereabouts of the user would be able to check the user's status. Consequently, more than absence or presence could be determined.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with a first aspect of the present invention, a method for distributing presence information to a plurality of devices is presented. The method determines if a presence device is within a range of a detection device. Continuing, the method determines presence information associated with the presence device if it is determined that the presence device is within the range of the detection device. The presence information includes a location of the detection device and an availability of the user of the presence device. Once presence information is determined, the method provides the presence information to a plurality of devices.

In accordance with another aspect of the present invention, a presence determination system is presented. Contained within the presence determination system is a presence device. A detection device is configured to determine whether the presence device is within a range of the detection device. The presence determination system also contains a management device configured to maintain a location and an availability of a user of the presence device, wherein the location corresponds to the detection device.

In yet another aspect, a computer readable media containing executable instructions on a management device is presented. When executed, the instructions configure the management device to receive presence information from a detection device. The detection device determines if a presence device is within a range of the detection device. Further, the instructions, when executed on the management device, determine an availability of a user of the presence device if it is determined that the presence device is within the range of the detection device.

Following the determination that the presence device is within a range of the detection device, the management device is configured to repeatedly locate a related device if the user of the presence device is available. The management device determines if the user of the presence device responds to one of the related devices. Presence information is updated if a user of the presence device responds to a related device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, embodiments of the present invention relate to a system and method for presence/absence determinations. In particular, embodiments of the present invention relate to a system and method for providing presence information that disclose presence/absence determinations to a number of interested parties wherein the presence information is defined by a detection device location and user availability. In an illustrative embodiment, detection of a presence device occurs when the presence device enters within an area corresponding to a range of the detection device. In turn, an associated management device receives information corresponding to presence device determinations from the detection device. The management device provides centralized information where distribution of that information to a number of devices operated by the interested parties can take place.

As previously stated, presence information includes a detection device location and user availability. Specifically, the location of the detection device refers to the area that is encompassed by the detection device. Further, availability information refers to the user's status. Namely, whether the user is "unavailable," "available," "busy," "in a meeting," "on a call," etc. Although not relevant to the present embodiment, presence information may also contain a name associated with the presence device, address related to the name, password information, credit card information, or any other type of personal information.

Figure 1:
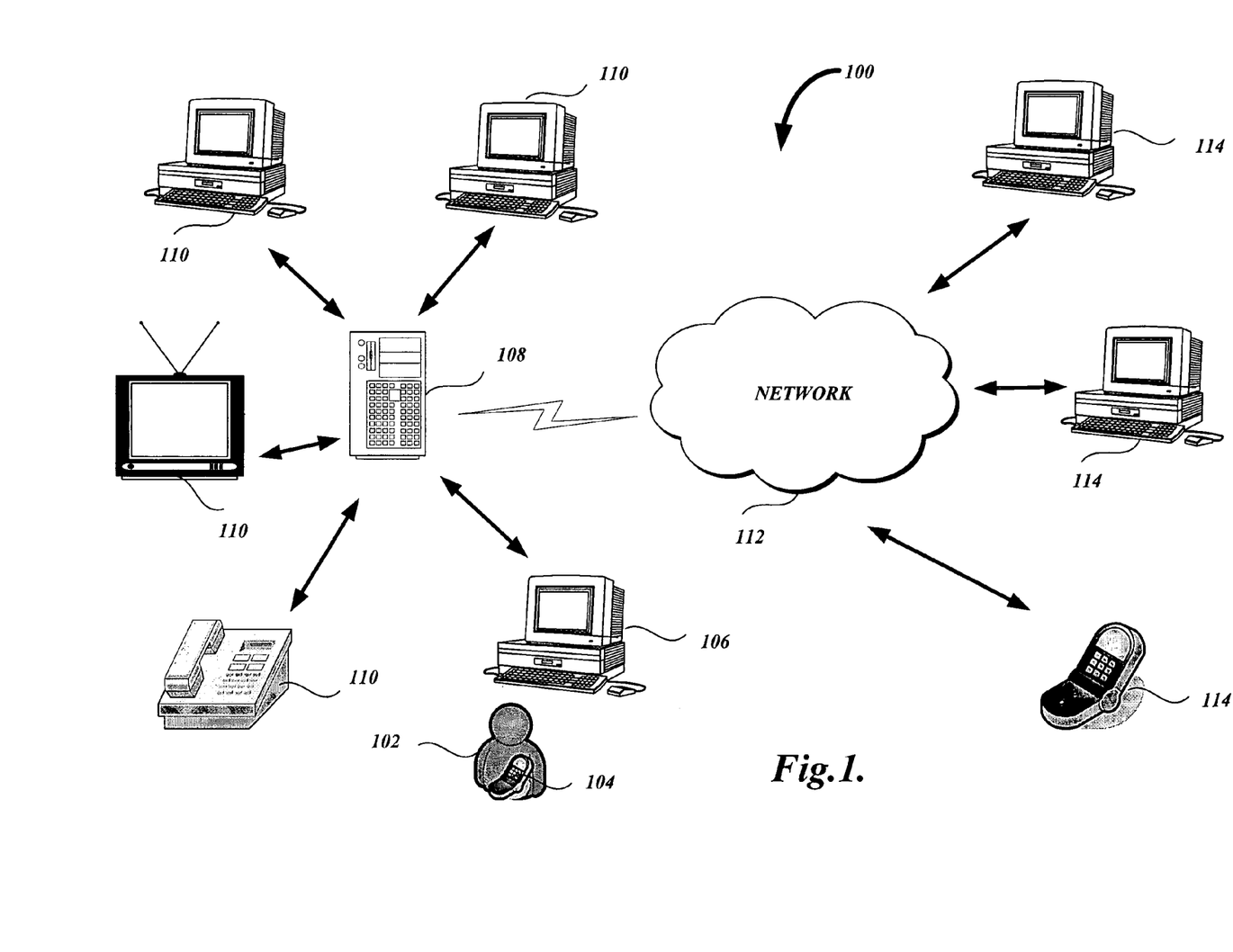
FIG. 1 is a diagram illustrating components of an exemplary system using a presence device in accordance with an aspect of the present invention.

Now referencing FIG. 1, a diagram illustrating components of an exemplary system 100 using a presence device 104 in accordance with an aspect of the current invention is presented. As shown, a user 102 posses a presence device 104 within a range of a detection device 106. Connected to each detection device 106 is a management device 108 for storing presence information. The management device may comprise of multiple servers receiving and transmitting presence information through a network. One skilled in the art would appreciate that a network 112 can include the Internet, an intranet network, a wide area network (WAN), a local area network (LAN), personal area network (PAN), wireless local area network (WLAN), and the like. As described above, presence information includes detection device 106 location and user availability. Further connected to the management device 106 is a number of related devices 110. The related devices 110 may correspond to a land-line phone, a cellular phone, a television, other networked computers, or any other device. As will be described in more detail below, users of the related devices 110 may determine the presence information of the user 102 of the presence device 104.

In a further embodiment of the present invention, a number of public devices 114 are connected to the management device 108 through a network connection 112. Each public device 114 may be represented by a land-line phone, a cellular phone, a television, other networked computers, etc. Similar to the related devices 110, users of the public devices 114 may determine the presence information of the user 102 of the presence device 104. In the current embodiment, the public devices 114 would be given access to all presence information. In another embodiment, the public devices 114 are given limited access to the presence information.

Figure 2:
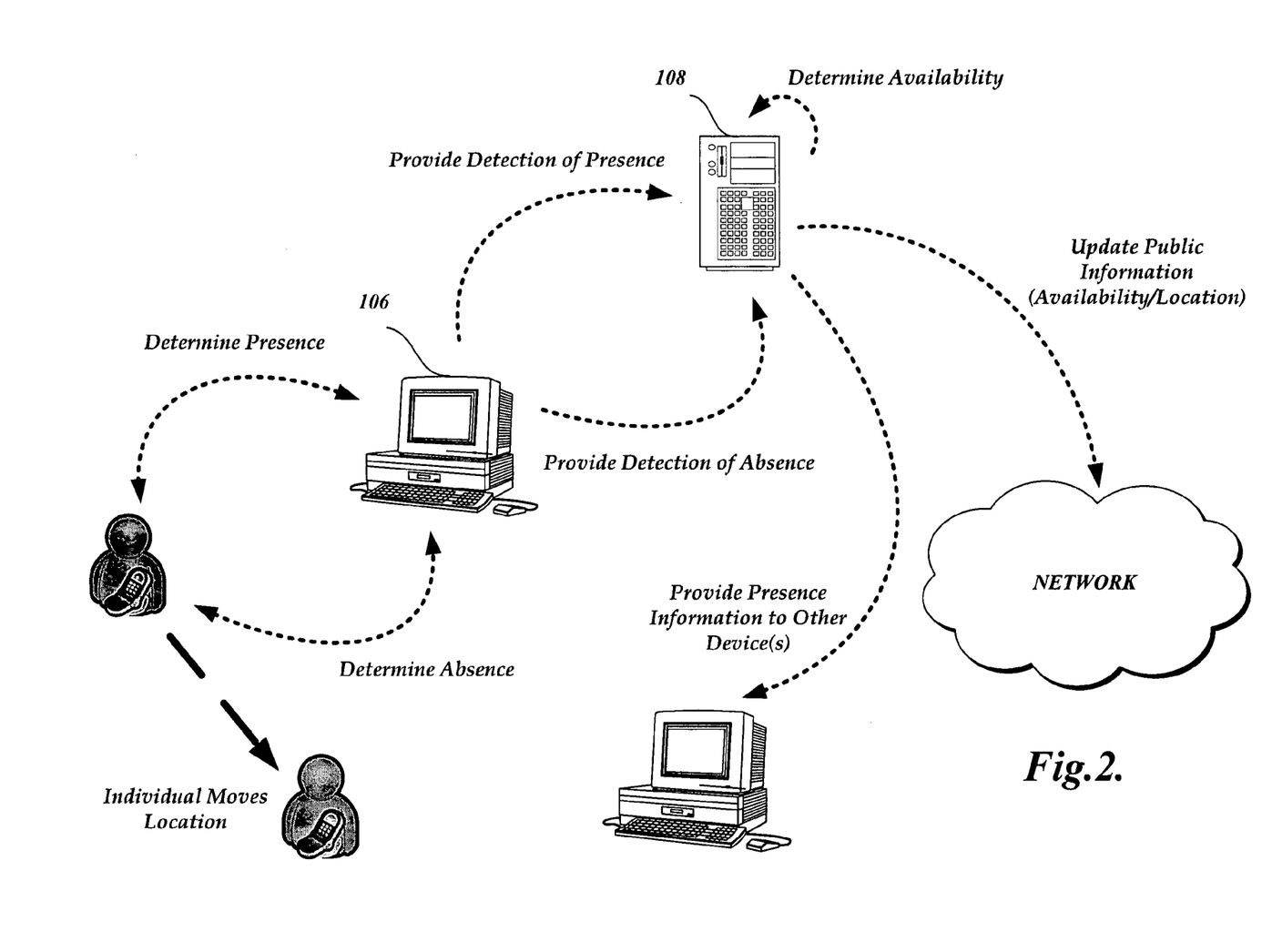
FIG. 2 is a pictorial diagram representing devices involved for detecting a presence device and managing presence information in accordance with an aspect of the present invention.

FIG. 2 is a pictorial diagram representing devices involved for detecting a presence device 104 and managing presence information in accordance with an aspect of the present invention. FIG. 2 shows a complete system in accordance with the present invention. Explicitly, the diagram shows the system in view of the detection device 106 and the system in view of the management device 108.

Figure 3:
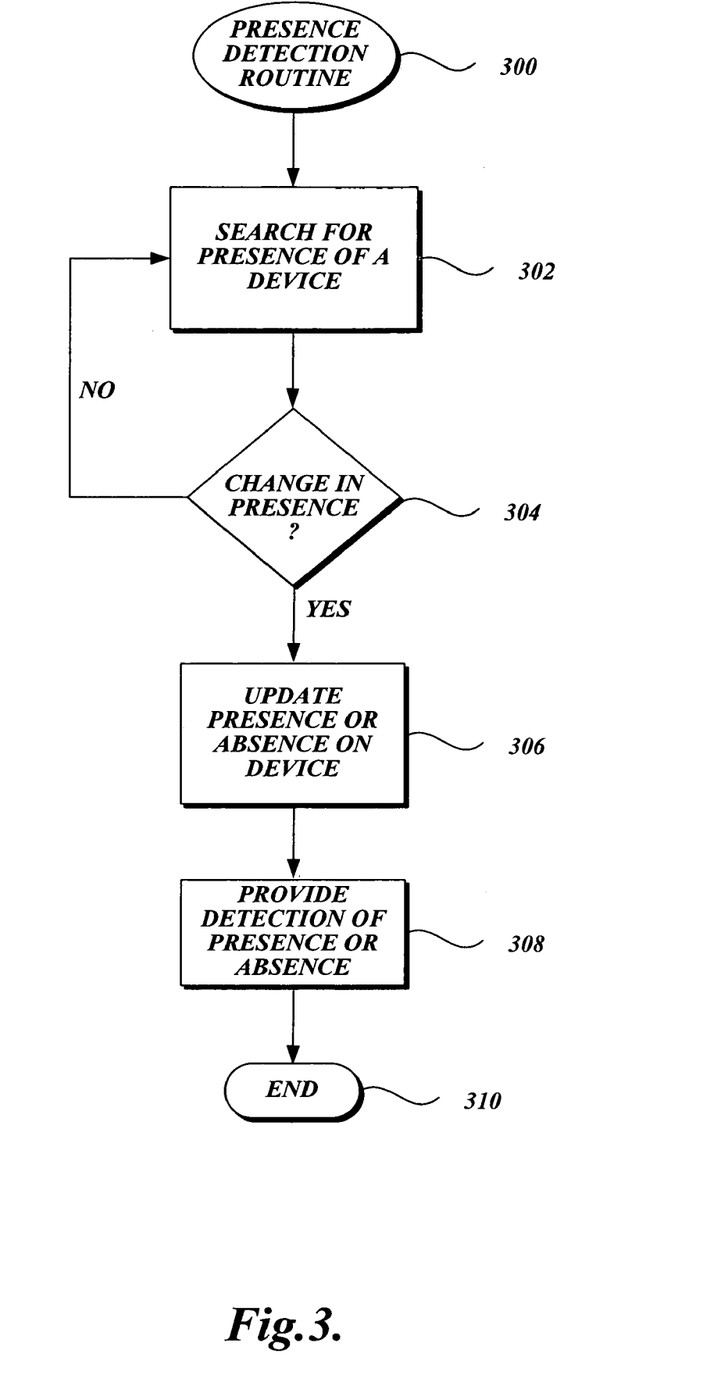
FIG. 3 is a flow diagram for detecting the presence or absence of a presence device from the perspective of a detection device in accordance with an aspect of the present invention.

Operations of the detection device 106 will now be described. FIG. 3 is a flow diagram for determining the presence or absence of a presence device 104 from the perspective of a detection device 106 in accordance with an aspect of the present invention. Specifically, the presence detection routine 300 determines if a presence device 104 is within a range of the detection device 106 and updates presence data in accordance with that determination.

Figure 4:
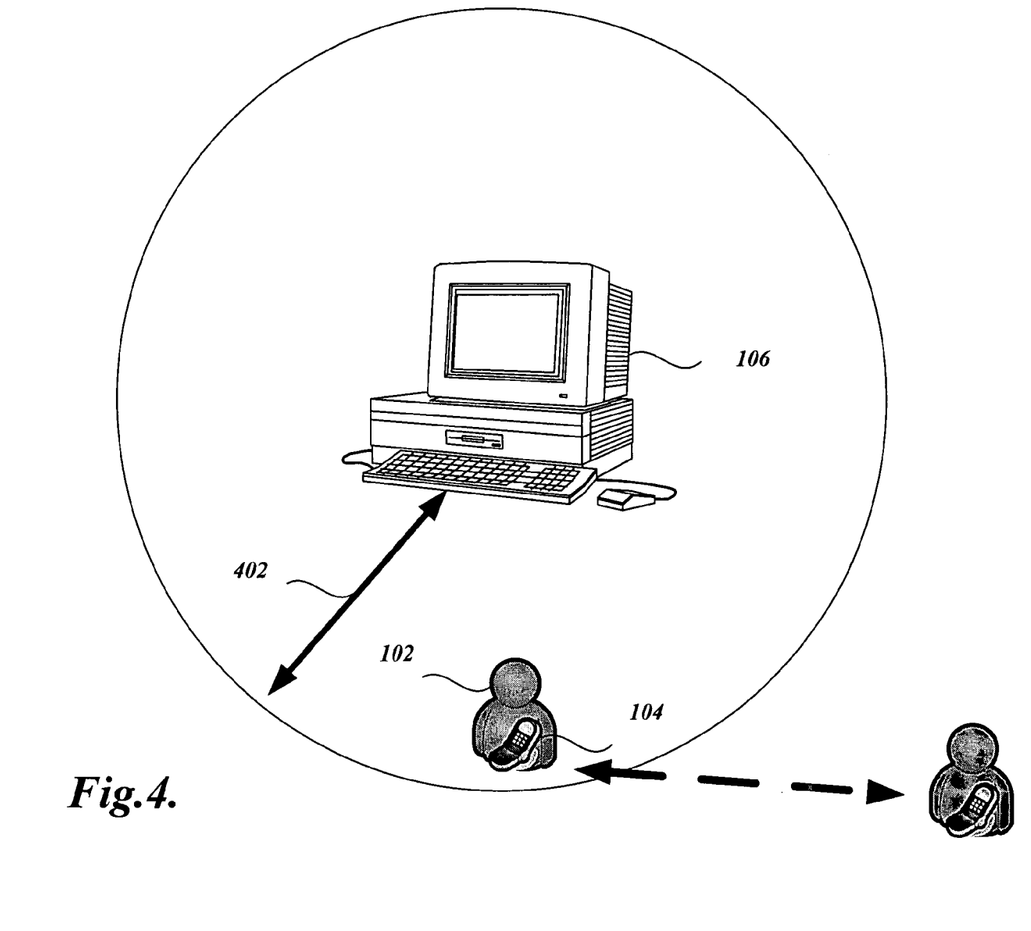
FIG. 4 is a pictorial representation of a presence device circumscribed within a range of a detection device in accordance with an aspect of the present invention.

Beginning at block 302, the detection device 106 searches for a presence device 104. For example, as shown in FIG. 4, a presence device 104 may be detected When it moves within an area defined by a range 402 of the detection device 106 in accordance with an aspect of the present invention. As shown, the presence device 104 may move inside and outside a range of the detection device 106. One skilled in the art would recognize that the detection device 106 and presence device 104 may be attached to a number of apparatuses. As shown, the detection device 106 is attached to a computer and the presence device 104 is attached to a cellular phone. In one example, the presence device 104 is connected to a cellular phone through a blue-tooth attachment. The detection device 106 may be associated with a number of presence devices 104. Alternatively, the detection device 106 can be associated with a singular presence device 104. For example, the detection device 106 selects a unique presence device 104 corresponding to an association between the detection device 106 and the unique presence device 104 among a number of presence devices 104 within a range 402 of the detection device 106. Further, a presence device 104 may be associated with a number of detection devices 106.

Each presence device 104 can contain and/or be associated with user specific information. Information about the user 102 can include the user's name, address, credit card information, etc. Protection of such information may occur through encryption. Pertaining to the blue-tooth example, the detection device 106 and the presence device 104 establish a trusted relationship known as "pairing" for security. Further, any detection device identification information may also be used for associating with other devices.

Determination of a presence device 104 within a range of the detection device 106 may occur through wireless means. One skilled in the art of wireless technology would understand that there are many ways of implementing such a determination. Continuing with the previous blue-tooth example, the presence device 104 and the detection device 106 use radio communication systems, so they do not have to be in line of sight of each other.

Operationally, the detection device 106 sends a detection signal to locate the presence device 104. If the presence device 104 is within a range 402, the signal is responded back to by the presence device 106. If no response is received, the detection device 106 resends the signal to locate the presence device 104 after an elapsed period of time. In a further embodiment of the present invention, the presence device 104 sends the signal to the detection device 106, instead of the detection device 106 sending the signal.

In another embodiment, the user may manually set a location of their physical presence without having the presence device 104. The user sets their physical location at the detection device 106 through user identification information, such as a password and log-in name.

Returning to FIG. 3, block 304 determines whether there has been a change in presence. If there is no change in presence, the routine 300 returns to block 302 periodically. If a change has occurred, presence information is updated. At block 306, the detection device 106 updates presence or absence information directly on the device 104. Further, the detection device 106 provides detection of presence or absence information to a management device 108 at block 308. As described below, the management device 108 handles and distributes presence information among a number of devices. The presence detection routine 300 ends at block 310.

Figure 5:
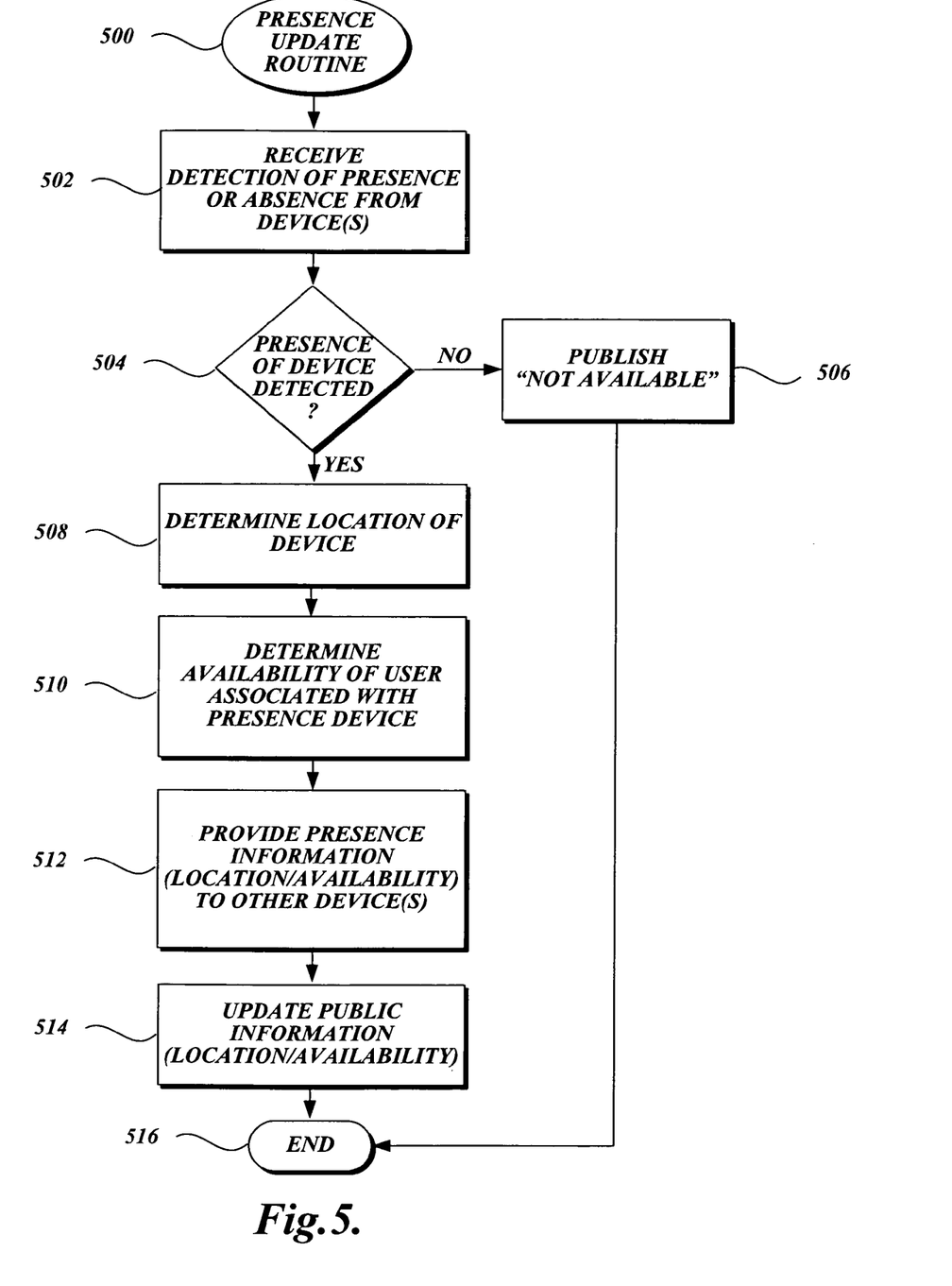
FIG. 5 is a flow diagram for a presence update routine from the perspective of a management device wherein the management device determines availability of a user and the location of a detection device and further provides the information to a number of devices in accordance with an aspect of the present invention.

Operations of the management device 108 will now be described. FIG. 5 is a flow diagram for a presence update routine 500 from the perspective of a management device 108 wherein the management device 108 determines availability of the user 102 and the location of the presence device 104 and further provides the information to a number of devices in accordance with an aspect of the present invention. Beginning at block 502, the management device 108 receives data regarding presence or absence of a presence device 102 from the detection device 106. After receiving the data, the management device 108 determines whether presence of a device is detected at decision block 504. At block 506, the management device 108 publishes to a number of devices that the user 102 of the presence device 104 is unavailable if there is an absence of the presence device 102. The routine 500 ends at block 516.

If, on the other hand, the presence device 104 has been detected at decision block 504, the management device 108 determines the location of the detection device 106 that sent the data at block 508. Continuing, availability of the user 102 associated with the presence device 102 is determined at block 510. Availability features provide the user with options describing their current status. Namely, a user could be "unavailable," "available," "busy," "in a meeting," "on a call," etc. The management device 108 determines availability through a variety of means. Accordingly, the management device 108 can detect if the user 102 is on a call. Moreover, electronic calendars can be checked to determine availability status. Further, the availability may be a user preference on the presence device 102. The user may also manually describe their availability status at the detection device 106. Following the determination of availability, the presence information is provided to other devices at block 512. More specifically, the presence information can be provided to related devices 110 and/or to a number of public devices 114. At block 514, public information is updated. The routine ends at block 516.

By providing presence information, corrections for system errors may be made. Continuing with the previous illustration, the sending of updated presence information to the other devices will correct any error regarding an erroneous detection device 106. For instance, if a first detection device 106 fails to detect a change in presence, the presence information retrieved from a second detection device 106 will inform the first detection device 106 that the user 102 of the presence device 106 is no longer within range of the first detection device 106. In turn, appropriate corrections will be made by the first detection device 106. Moreover, security is provided. Because the first detection device 106 failed to log out properly, a deviant user may still access information at that particular location. By providing presence information, the first detection device 106 will disengage any deviant users.

Figure 6:
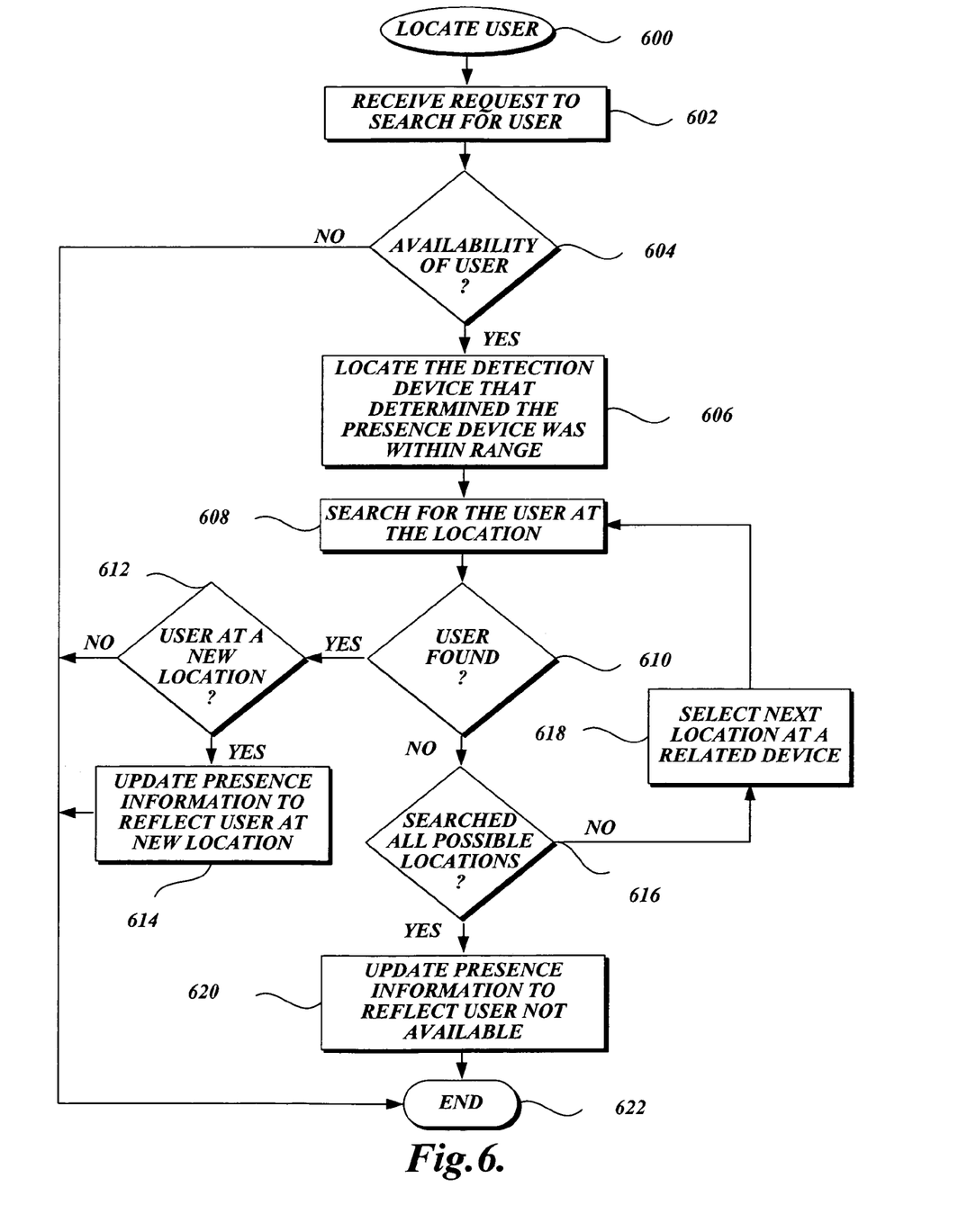
FIG. 6 is a flow diagram representing a search for a user among related devices and updating corresponding information in accordance with an aspect of the present invention.

In accordance with another aspect of the present invention, FIG. 6 is a flow diagram representing a search routine 600 for locating a user among related devices and updating corresponding information in accordance with an aspect of the present invention. More specifically, FIG. 6 relates to actions taken when a user 102 of a presence device 104 cannot be found at the location of detection, but may be found elsewhere.

Starting at block 602 of routine 600, the management device 108 receives a request from an interested party seeking the user 102 of the presence device 104. Accordingly, this can be a call, an instant message, an invitation to collaborate, etc. In turn, the management device 108 determines the availability of the user at decision block 604. When the user 102 of the presence device 104 is unavailable, the routine 600 ends at block 622. Alternatively, when the management device 108 determines that the user 102 is available, the management device 108 locates the appropriate detection device 106 at block 606. The management device, as previously stated, contains presence information corresponding to presence/absence determinations. Included in the information is the location of the detection device 106 that determined that the presence device 104 was within an area corresponding to a range 402 of the detection device 106. Using that information, the management device tracks the location of the detection device 106 associated with the presence device 104.

The management device 108 searches for the user 102 at the location of the appropriate detection device 106 at block 608. At decision block 610, a determination whether the user 102 has been found is made. If the user 102 is found, the management device 108 determines if the user is at a new location at decision block 612. If it is determined that the user is not at new location, the device does not need to update the presence information. If, however, the user 102 is found at a new location, then the management device 108 updates presence information to reflect accordingly at block 614.

Continuing, if the user is not found at decision block 610, at decision block 616, the management device 108 determines whether all locations have been searched in trying to locate the user 102. When a device has not been searched, the device is selected at block 618 and searched by repeating block 608. On the other hand, when all the related devices have been searched, the management device 108 at block 620 updates the presence information to reflect that the user 102 is unavailable. Consequently, the routine 600 terminates at block 622.

Figure 7:
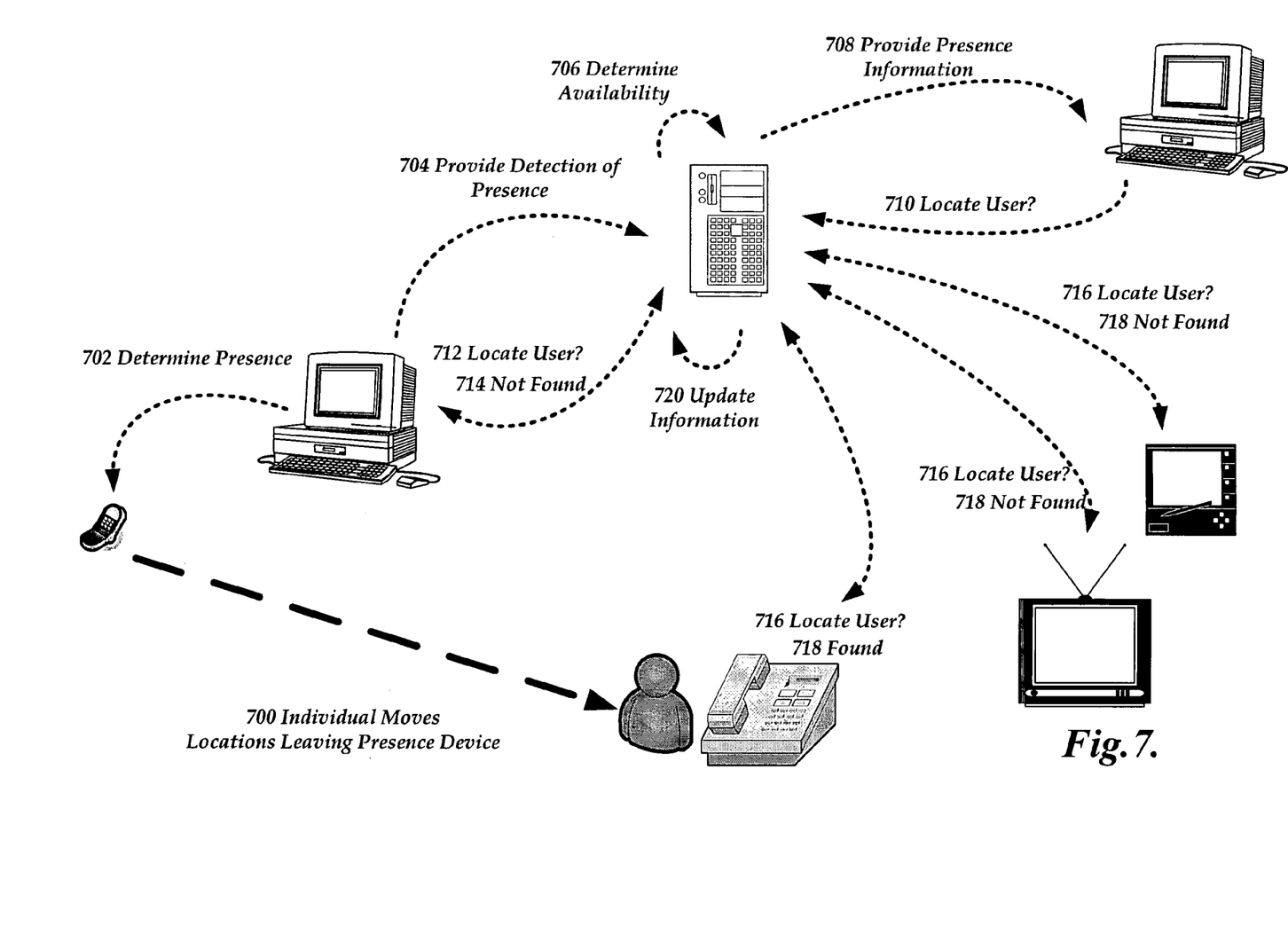
FIG. 7 pictorially represents events taken by the management device to locate a user of a presence device wherein the presence device is detected, but the user is not located near the detection device in accordance with an aspect of the present invention.

FIG. 7 pictorially represents events taken by the management device to locate a user of a presence device wherein the presence device is detected, but the user is not located near the detection device, in accordance with an aspect of the present invention. At step 700, the user 102 of the presence device 104 leaves the presence device 104 near the detection device 106. In an exemplary scenario, the user 102 leaves the presence device 104 at home while the user 102 goes to work. In another scenario, the user 102 may have left the presence device 104 in their car while the user 102 goes into their home.

Following step 700, the presence device 104 is detected by the detection device 106 at step 702. Information is provided to the management device 108 at step 704. Availability of the user 102 is determined at step 706. The presence information is provided to a related device at step 708, which in turn, wants to locate the user 102 at step 710.

Subsequently, the management device 108 searches the devices at which a user 102 may be located. Accordingly, the management device 108 starts with the detection device 106 that detected the presence device 104 at steps 712 and 714. If not found, the management device 108 continues to search each device until the user 102 is found at steps 716 and 718. Continuing with the examples above, when the presence device 102 is left at home, the management device 108 will search related devices at the user's 102 home and then devices at work. With respect to leaving the presence device 104 in the car, the management device 108 will search related devices at home.

At step 720, presence information for the user 102 on the management device 108 is updated if the user 102 verifies their identity. When the user 102 is initially found at steps 716 and 718, the user 102 will be denied access to change the presence information. The user 102 may override the presence/absence determination system without the presence device 104 by using verification information such as a password. Once verified, the management device 108 updates the presence information and informs other devices of the updated location. One skilled in the art would recognize that some devices which the user 102 may be found at do not require verification information.

While illustrative embodiments have been illustrated and described, it will be appreciated that various changes can be made therein without departing from the spirit and scope of the invention.

What is claimed is:

1. A method for distributing presence information to a plurality of devices, the method comprising:
   determining if a presence device is within a range of a detection device;

when it is determined that the presence device is not within the range of the detection device, storing absence information on the detection device and sending the absence information to a management device, the management device being separate from the detection device;

when it is determined that the presence device is within the range of the detection device:

storing information on the detection device regarding the detection of presence of the presence device;

sending the presence information regarding the detection of presence to the management device;

on the management device, determining an availability status of a user of the presence device and determining a location of the detection device;

on the management device, when it is determined that the user is not available, determining an availability status for the user of the presence device, the determination of the availability status for the user of the presence device comprising the management device detecting whether the user is on a call and the management device checking an electronic calendar to determine the availability status for the user; and on the management device, storing presence information associated with the presence device, the management device storing presence information for a plurality of presence devices, wherein presence information includes the location of the detection device and the availability status of the user of the presence device; and providing the presence information to a plurality of devices, the providing of the presence information to the plurality of devices including updating a second detection device to indicate that the user is not located near the second detection device.

2. The method of claim 1, further comprising detecting a change in presence, wherein the change in presence occurs when the presence device moves outside of the range of the detection device.

3. The method of claim 2, further comprising updating presence information to reflect the unavailability of the user at the detection device.

4. The method of claim 1, wherein the presence information is provided to the plurality of devices by the management device in response to receiving an acknowledgment from the detection device that the presence device has been determined to be within range of the detection device.

5. The method of claim 1, wherein determining if the presence device is within the range of the detection device comprises selecting a unique presence device from multiple presence devices corresponding to an association between the detection device and the unique presence device.

6. The method of claim 1, further comprising repeating determining if a presence device is within a range of the detection device, determining presence information associated with the presence device, and providing the presence information to a plurality of devices for each presence device within the range of the detection device.

7. The method of claim 1, wherein providing the presence information to a plurality of devices further comprises:

providing the presence information to related devices; and updating public information with the presence information, the public information accessible by a plurality of public devices.

8. The method of claim 7, wherein updating public information with the presence information includes limited presence information.

9. A presence determination system comprising:

a presence device;

a detection device configured to determine whether the presence device is within a range of the detection device, the detection device storing information regarding whether the presence device is within the range of the detection device; and a management device configured to maintain presence information corresponding to a location of the detection device and an availability status of a user of the presence device, the management device configured to update a second detection device with the presence information to indicate that the user is not located near the second detection device, wherein the detection device provides the information regarding whether the presence device is within range of the detection device to the management device, and wherein, when the user is not available, the management device determines an availability status for the user, the determination of the availability status for the user comprising the management device detecting whether the user is on a call and the management device checking an electronic calendar to determine the availability status for the user.

10. The presence determination system of claim 9, further comprising a plurality of devices, wherein the management device updates the plurality of devices with the location of the detection device and the availability of the user of the presence device.

11. The presence determination system of claim 9, wherein the presence device is associated with user specific information.

12. The presence determination system of claim 9, wherein the management device comprises multiple servers receiving and transmitting the location of the detection device and the availability of the user of the presence device.

13. The presence determination system recited of claim 9 wherein the detection device is an attachment to a computer.

14. The presence determination system of claim 9, wherein the detection device uses wireless technology to determine whether the presence device is within the range of the detection device.

15. The presence determination system of claim 14, wherein the presence device comprises of an attachment to at least one of a phone, a cellular phone, or a PDA.

16. A computer readable storage medium containing executable instructions on a management device that when executed configures the management device to:

receive a request to locate a user of a presence device;

when the request is received, determine if the user is available;

when it is determined that the user is not available, determine an unavailability status for the user of the presence device, the determination of the unavailability status for the user of the presence device comprising determining whether a first unavailability status, a second unavailability status or a third unavailability status has been described by the user, the first unavailability status being busy, the second unavailability status being in a meeting and the third unavailability status being on a call, the determination of the unavailability status for the user further comprising the management device detecting whether the user is on a call and the management device checking an electronic calendar to determine the availability status for the user;

when it is determined that the user is available, identify a detection device that is associated with the presence device, wherein the detection device determines if the presence device is within a range of the detection device;

when it is determined that the user is available, update presence information directly on the presence device;

when the presence device is within the range of the detection device, receive data from the detection device indicating that the presence device is within range of the detection device;

after the data is received, determine whether the user is at the location of the presence device;

when data is received from the detection device and when it is determined that the user is not at the location of the presence device, identify related devices;

for each identified related device:
  determine if the user is at the location of the related device; and
  when it is determined that the user is at the location of the related device, update presence information, wherein the presence information includes the availability of the user and the location of the related device; and provide the presence information to a plurality of devices, the providing of the presence information to the plurality of devices including updating a second detection device to indicate that the user is not located near the second detection device.

17. The computer readable storage medium of claim 16, wherein the management device is further configured to receive and maintain availability and location information from a plurality of detection devices.

18. The computer readable storage medium of claim 16, wherein the management device configured to update presence information is further configured to receive verification information.

19. The computer readable storage medium of claim 16, wherein the detection device is the related device.

* * * * *